Figure 1:
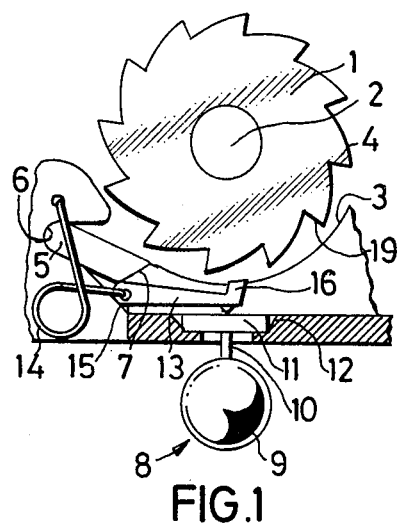
Figure 2:
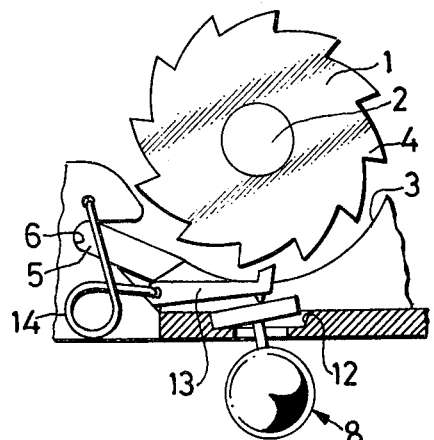
Figure 3:
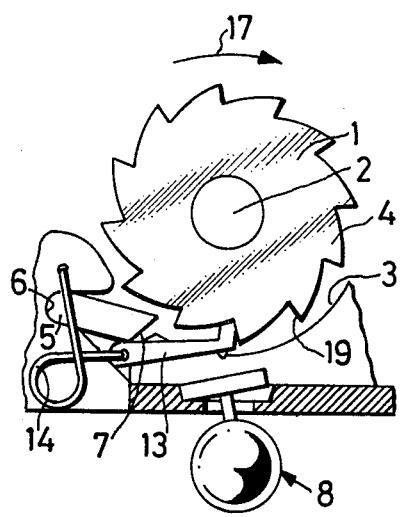
Figure 4:
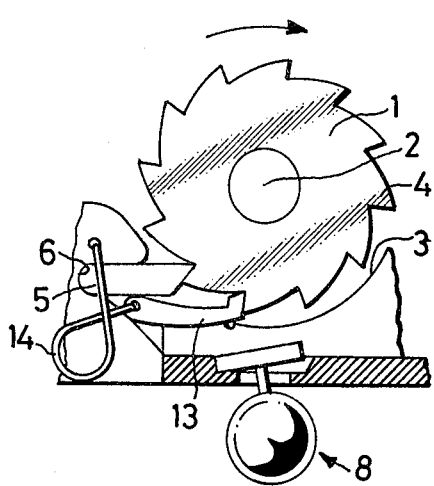

United States Patent [19]

Lindbald

[11] 4,085,905

[45] Apr. 25, 1978

[54] BLOCKING DEVICE PREFERABLY FOR REEL-TYPE SAFETY BELTS FOR VEHICLES

[76] Inventor: Oskar Lennart Lindbald, Hedasgatan 6 440 20, Vargarda, Sweden

[21] Appl. No.: 605,348

[22] Filed: Aug. 18, 1975

[30] Foreign Application Priority Data

Aug. 29, 1974 Sweden .............................. 7410929

[51] Int. Cl.² ............................................. B65H 75/48
[52] U.S. Cl. ........................... 242/107.4 A; 74/577 S; 74/575; 335/140
[58] Field of Search ............... 242/107.4 A; 74/577 S, 74/577 R, 575; 335/140

[56] References Cited

U.S. PATENT DOCUMENTS

| | | | |
|---|---|---|---|
| 3,823,893 | 7/1974 | Svensson | 242/107.4 A |
| 3,857,528 | 12/1974 | Fiala | 242/107.4 A X |
| 3,889,898 | 6/1975 | Ziv | 242/107.4 A |
| 3,901,459 | 8/1975 | Romanzi et al. | 242/107.4 A |
| 3,917,188 | 11/1975 | Nilsson | 242/107.4 A |

*Primary Examiner*—Samuel Scott
*Assistant Examiner*—Randall Heald
*Attorney, Agent, or Firm*—Ulle C. Linton

[57] ABSTRACT

A blocking device for vehicle reel-type safety belts with a ratchet wheel to be connected to the reel of the safety belt, a pair of pivotal pawls engageable with the ratchet wheel to prevent rotation of the ratchet wheel and thus the reel in one direction of rotation of the reel, a mechanism operable by an abnormal change of speed of the vehicle, capable of pivoting one of the pawls into engagement with the ratchet wheel and then said one pawl pivots the other of the pawls into engagement with the ratchet wheel stopping the unwinding of the safety belt.

11 Claims, 13 Drawing Figures

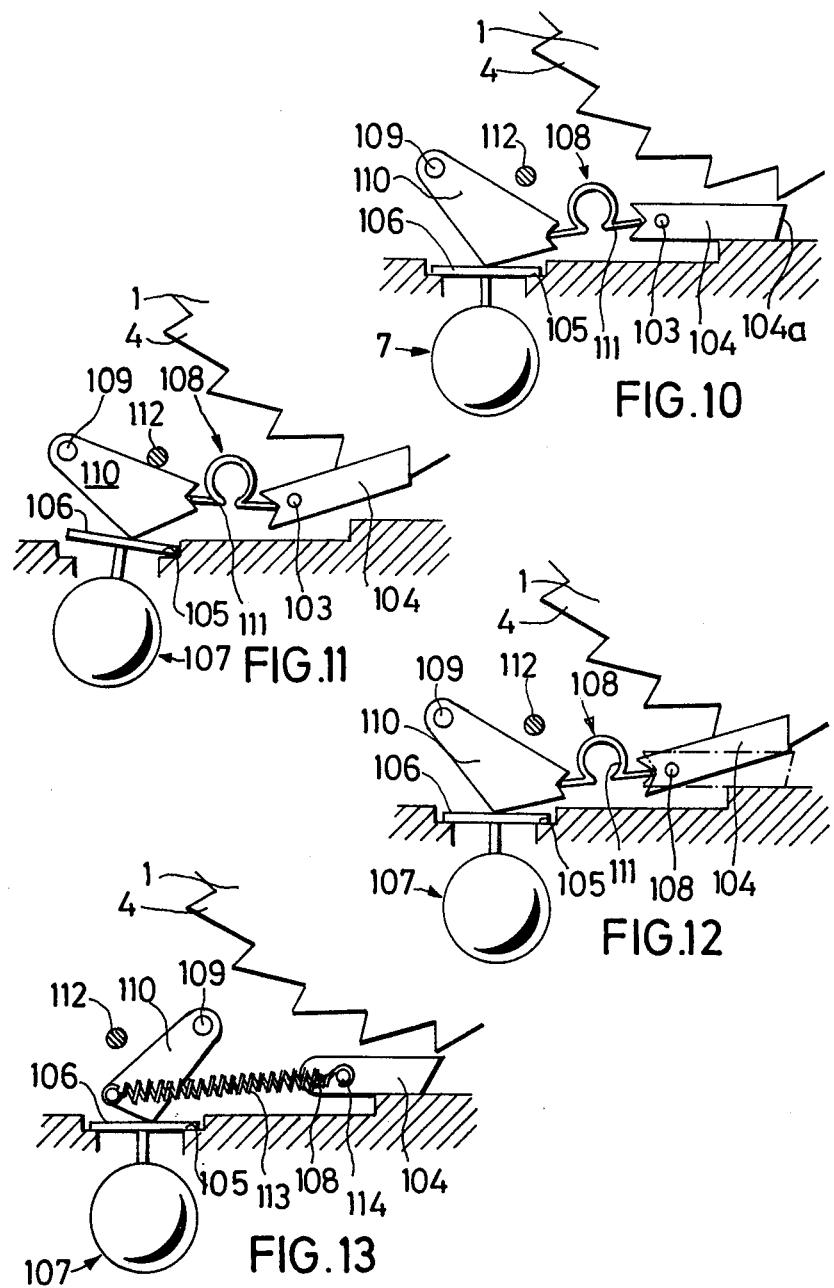

BLOCKING DEVICE PREFERABLY FOR REEL-TYPE SAFETY BELTS FOR VEHICLES

The present invention relates to a blocking device preferably for so called reel-type safety belts for vehicles, which device by means of a blocking pawl is arranged to impede the movement at least in one of its directions of rotation of a ratchet wheel provided with teeth, said blocking pawl being designed in such a manner that from a normal position outside of the path of movement of the teeth it can be brought into engagement with the ratchet wheel by the action of an actuation means.

In connection with blocking devices of the kind mentioned it has turned out that there is a risk of the blocking pawl not arriving in a position of complete engagement with the teeth of the ratchet wheel, and instead gets stuck at the point of one of the teeth, which involves the risk of the blocking pawl, when heavily loaded, loosing its grip of engagement, so that the ratchet wheel will pivot a certain distance before the blocking pawl again can be engaged. The sharp edges of the blocking pawl and the points of the teeth are then subjected to a considerable wear resulting in further deterioration of their function.

It is an object of the present invention to eliminate the above mentioned drawbacks by means of a blocking device, which substantially is characterized by the blocking device comprising an auxiliary blocking pawl which is arranged to be brought into engagement with the teeth of the ratchet wheel by action of the actuation means and when this takes place to bring the blocking pawl into said engagement.

Further to prevent the auxiliary pawl being subjected to said drawbacks it can be influenced by a force which is directed towards the pivot axis of the pawl, the line of action being moved from one to another side of said pivot axis of the pawl caused by the movement of the actuation means from inactive to active condition and thereby causing the auziliary pawl to occupy two distinct positions i.e. one position in engagement with a tooth wheel and one position out of engagement with said tooth wheel.

Figure 5:
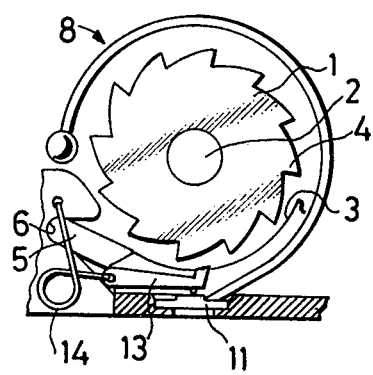
Figure 6:
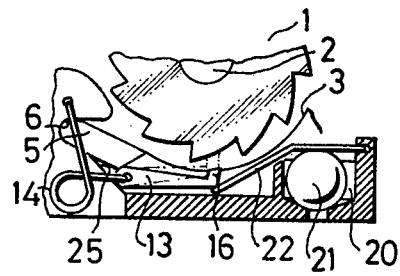
Figure 7:
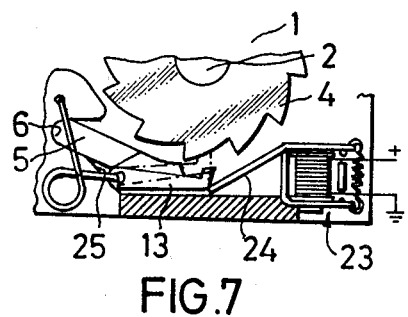
Figure 8:
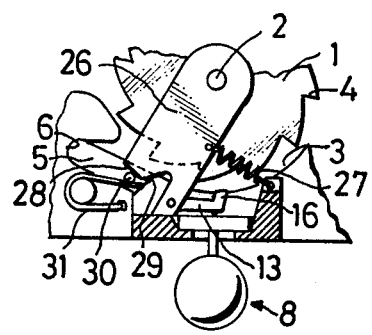
Figure 9:
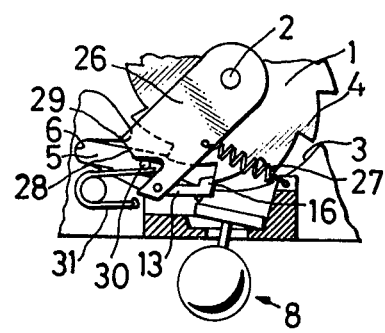

The invention will now be described more in detail in connection with a few examples of embodiment, reference being made to the accompanying schematic drawings, in which FIGS. 1–4 schematically illustrate a first embodiment of the blocking device according to the invention in different positions of operation, FIG. 5 is a second embodiment with a pendulum, which requires exceptionally little space for its accomodation, FIG. 6 is another embodiment, in which the actuation means comprises a ball, FIG. 7 is a still further example of the blocking device according to the invention, in which the actuation means comprises an electro magnet, FIGS. 8 and 9 show one more embodiment of the blocking device according to the invention, FIGS. 10–12 illustrate a first embodiment of a first device intended to give a locking pawl in general distinct positions but which with advantage can be used in connection with the auxiliary pawl according to the embodiments which are shown in FIG. 1–9, and FIG. 13 shows a further embodiment of the locking device which is shown in FIG. 10–12.

As is evident from the example of embodiment illustrated in the FIGS. 1–4 the blocking device comprises a ratchet wheel 1 which has its axis 2 rotatably mounted in a schematically shown blocking house 3 and which is provided with teeth 4 designed in such a manner that they impede rotation of the ratchet wheel in one direction in connection with an engagement of the blocking pawl 5 with the teeth of the wheel. The blocking pawl 5 is pivotably bearing against the bottom of a pocket 6 of the block house 3 and its engagement end is designed with an oblique blocking surface 7. An actuation organ 8 enters into the assembly of the blocking device for serving the purpose to actuate the blocking pawl 5. Said actuation organ in the present example of embodiment comprising a suspended pendulum, thus being of the type sensitive to acceleration, in the first place intended for use in connection with so called reel-type safety belts, in which the blocking device according to the invention is intended for use in order to impede the unwinding of the band of the safety belt, when an abnormal change of speed of a vehicle takes place. In this particular case the pendulum comprises a body of inertia 9, which via an arm 10 is rigidly connected with a plate 11, which in normal position rests in a seat 12 in the blocking house 3.

Between the pendulum 8 and the blocking pawl 5, in the design according to the invention an auxiliary blocking pawl 13 is incorporated, which auxiliary pawl via a pressure spring 14 is connected with the blocking house 3 and is pivotably mounted round the point 15 of attachement of the spring at one end of said auxiliary pawl, against which the engagement end of the blocking pawl 5 is arranged to bear in rest position. At its opposite end the auxiliary pawl 13 is shaped with a hook 16, the underside of which rests against the top side of the plate 11 of the pendulum 8.

Assuming that the blocking device according to the invention illustrated in the FIGS. 1–4 enters into the assembly of a reel-type safety belt mounted in a vehicle, the following will occur in case of abnormal change of speed of the vehicle such as, by way of example, a sudden braking action or collision. By the action of the body of inertia 9 the pendulum 8 will pivot, whereby the plate 11 tilts in its seat 12, which results in that the end 16 of the auxiliary pawl, which is shaped as a hook and bears against the plate 11, being brought in an upwards direction towards the ratchet wheel 1 and into engagement with the teeth 4 of this wheel. When the ratchet wheel 1 starts rotating in the direction of the arrow indicated by 17 due to a pull in the band of the safety belt, the auxiliary pawl 13 against the bias of the spring 14, is brought under the pawl 5, which thereby is pivoted upwards towards the ratchet wheel 1 and into a quick engagement into the space between two teeth, so that its blocking surface 7 bearing against one of the blocking surfaces 19 of the teeth 4. As is evident from FIG. 4 the blocking pawl 5 will engage the tooth 4, which is located nearest to the tooth engaged by the auxiliary pawl 13. Because of the non-yielding support of the blocking pawl 5 in the pocket 6, the ratchet wheel is thereby blocked against further rotation in said direction. When said abnormal actuation upon the vehicle has ceased, and the band of the safety belt has been relieved of its load, the auxiliary pawl 13 by actuation of the spring 14 is returned to its normal position resting upon the plate 11 which then rests in its seat 12, whereby the blocking pawl 5 pivots down to its normal position (see FIG. 1).

In the example of embodiment of the blocking device illustrated in FIG. 5 the downhanging ball of the pendulum has been substituted by an upright standing pendulum, which from the plate 11 extends in circular shape round the periphery of the ratchet wheel 1.

In FIG. 6 an example of an embodiment is shown, in which the pendulum is replaced by a ball 21 resting in a cup 20, said ball being arranged in case of a strong acceleration to pivot a lever arm 22, which is pivotably mounted in the blocking house 3 below the hook 16 of the auxiliary pawl and resting against the ball.

In FIG. 7 an example of actuation means of non-acceleration sensing type is illustrated, which comprises an electromagnet 23, which can be controlled by closing a circuit. Said electromagnet being arranged by means of a lever arm 24 to bring the auxiliary pawl 13 into engagement with the ratchet wheel 1.

In the embodiment of the blocking device described above the auxiliary pawl 13 causes the pawl 5 to pivot upwards against the ratchet wheel 1 with the end of said auxiliary pawl bearing against the blocking pawl 5, whereby said end is pressed in between the blocking pawl 5 and an oblique guiding surface 25 in the blocking house 3. In the FIGS. 8 and 9 another example is shown of the design of the auxiliary pawl 13 and consequently also of its actuation of the blocking pawl 5. In this example the auxiliary pawl 13 is provided with a pivotable arm 26, which by way of example is journaled on the shaft 2 of the ratchet wheel, and in which arm the hook 16 of the auxiliary pawl is pivotably mounted. This arm 26 can pivot against the blocking pawl 5 against the bias of a tension spring 27, and in its lower portion it is shaped with a supporting edge 28, which passes over into a recess 29. In its engaging end the blocking pawl 5 is provided with a projection 30, which in the normal position bears against the supporting edge 28 of the arm 26 (see FIG. 8). In case of an abnormal change of speed of the vehicle the pendulum 8 is brought to pivot in one direction, whereby the auxiliary pawl 13 is brought into engagement with the ratchet wheel and is carried along, whereby the arm 26 is pivoted and the projection on the blocking pawl 5 is inserted into the recess 29, i.e. the blocking pawl 5 is pivoted to engagement with the ratchet wheel, which takes place by actuation of a spring 31.

A common feature of the different embodiments is the fact that the mechanism is dimensioned in such a manner that the blocking pawl 5 quickly is inserted into the space berween two teeth, the distance between the attacking ends of the two pawls in engagement position suitably being substantially a multiple of the tooth pitch of the ratchet wheel 1.

The blocking device illustrated in FIG. 11 comprises a pawl 104, pivotably mounted at an axis 103, which can block the ratchet wheel 1 against rotation in one direction. The blocking pawl 104 can preferably be used in the embodiments according to FIG. 1–9 substituting the auxiliary pawl 13, whereby the axle 103 is substituted by the attachment point 15 of the spring member 14. On a foundation 105 an actuation organ 7 in the form of a pendulum is suspended by means of a plate 106, which organ thus is of a type sensitive to acceleration and arranged to change position by way of example, when an abnormal change of speed of a vehicle takes place, in which vehicle the blocking device forms part of a reel-type safety belt assembly. In order to sense the position of the pendulum 107 and to transmit a force to the pawl 104 at its pivoting movement between a releasing position and a blocking position, a power transmission means 108 is arranged according to the invention, which means comprises an arm 110 pivotably mounted on an axis 109, which arm with its movable end is arranged to bear against the top side of the plate 106 of the pendulum 107, and a spring 111, which in the example illustrated in FIGS. 10–12 comprises a pressure spring such as a so called omega-spring. Said spring is stretched between the arm 110 and the pawl 104 in such a manner that the line of direction along which the force acts upon the pawl 104 in the normal position (see FIG. 10) is between the axis 103 of the pawl and the ratchet wheel 1. The force, which the pressure spring 11 excercises upon the arm 110 is applied in such a manner that the line of direction along which it acts all the time is beneath the axis 109 of the arm, whereby this force tends to keep the arm pivoted down into the normal position illustrated in FIG. 10. The pivoting movement of the arm 110 in an upward direction is limited by a stop dog 112.

When the blocking device is in the normal position illustrated in FIG. 10, the pawl 104 thus is kept in a releasing position, as the force acting upon the pawl 104 attacks along a line of direction located above the axis 103 because of the fact that the pendulum 107 is in a rest position and consequently the arm in its lower end position. In case of an abnormal change of movement of the vehicle, where the blocking device according to the invention is installed, the pendulum pivots into the position illustrated in FIG. 11, whereby the plate 106 pivots the arm 110, which bears against its top side, an upward direction round its axis 109 against the stop dog 112 at its upper end position. By the pressure spring 111 following the arm 110 in its pivoting movement, a change of direction of the force acting upon the pawl 104 is taking place, so that the line of direction of the force will be beneath the axis 103 of the pawl, which results in that the pawl pivoting over to the blocking position with its engaging end 104 engaging the teeth 2 of the ratchet wheel 1.

After the abnormal change of speed of the vehicle has ceased, and the pendulum 107 again occupies its rest position, in which the arm 110 by the bias of the spring 111 is pivoted down, the pawl 104 remains in its blocking position (see the position indicated by a continous line in FIG. 12). The spring force acting on the pawl 104 in spite of the downwards pivoting of the arm 110 is namely still directed with its line of direction located beneath the pivoting axis 103 of the pawl. As soon as the ratchet wheel 1 is turned in its direction opposing the blocking direction, the nearest tooth 2 of the ratchet wheel will bring the pawl 104 out of engagement, whereby the direction of the spring force acting upon the pawl is changed, so that its line of direction is moved upwards above the axis 103 resulting in a distinct downwards pivoting movement of the pawl into its releasing position, which in the FIG. 12 is indicated with a dashed and dotted line.

In the embodiment which is illustrated in FIG. 13 the required spring force is provided by means of a tension spring 113. In comparison with the described example above, the arm 110 in this embodiment is reversed and the point of attachment 114 of the spring 113 on the pawl 104 has been displaced to a point beyond the axis 103, whereby in principal a corresponding function is obtained. However, the forces between the arm 110 and the pawl 104 are pulling forces, whereby their lines of direction relative to the axis 103 of the pawl will have an opposite location compared with the example of embodiment with a pressure spring.

The invention is not limited to the examples of embodiment described above and illustrated in the drawing, but can be varied within the scope of the following claims. By way of example one can imagine the actuation organ 107 to be of a different type, in which connection also the arm may be of another design.

What I claim is:

1. Blocking device for vehicle reel-type safety belts comprising a rotatably mounted ratchet wheel having teeth and capable of being connected to the reels of the safety belts, a pivotally mounted blocking pawl positioned for at times engaging the teeth of said ratchet wheel for preventing rotation of said ratchet wheel in one direction, actuating means being operable upon an abnormal change of speed of the vehicle, a pivotally mounted auxiliary pawl being postioned for being pivoted by said actuating means into engagement with said teeth and pivoting said blocking pawl into engagement with said teeth upon actuation of said actuating means, and resilient means tending to retain said auxiliary pawl into engagement with said actuating means.

2. Blocking device according to claim 1, wherein said auxiliary pawl is arranged to bring said blocking pawl into engagement with the teeth of said ratchet wheel at a given distance of said teeth from the engagement point therewith of said auxiliary pawl.

3. Blocking device according to claim 2, wherein said distance substantially corresponds to the tooth pitch of said ratchet wheel.

4. Blocking device according to claim 1, wherein a support of said pawls has a guiding surface and said auxiliary pawl is arranged to penetrate in between said blocking pawl and said guiding surface for pivoting said blocking pawl into engagement with said ratchet wheel.

5. Blocking device according to claim 1 including a pivotally mounted arm, said auxiliary pawl being pivotally mounted on said arm, a support for said pawls, a sping being connected to said support and said arm, said arm being pivotable against said blocking pawl against the bias of said spring and being arranged to bring said blocking pawl into engagement with said ratchet wheel.

6. A blocking device according to claim 5 wherein said blocking pawl has a projection, a second spring bears against said projection, said arm has a supporting edge against which said projection bears in the normal position of said blocking pawl, and a recess into which said projection enters under the bias of said second spring, when said arm is pivoting against said blocking pawl.

7. Blocking device according to claim 1 wherein said actuation means is of an acceleration-sensing type.

8. Blocking device according to claim 7 wherein said actuation means comprises a pendulum, a plate rigidly connected with said pendulum, a foundation having said plate resting thereon, and said auxiliary pawl is bearing on said plate.

9. Blocking device according to claim 8 wherein said actuation means comprises an upright pendulum extending with a substantially circular curvature around the periphery of said ratchet wheel.

10. Blocking device according to claim 7 wherein said actuation means comprises a cup, a ball movable in said cup and a pivotable lever arm bearing against said ball and said auxiliary pawl.

11. Blocking device according to claim 1 including a spring connected to said auxiliary pawl and an arm pivotable around an axis and connected with said spring, said arm being arranged to be pivoted by said actuation means.

* * * * *